Figure 1:
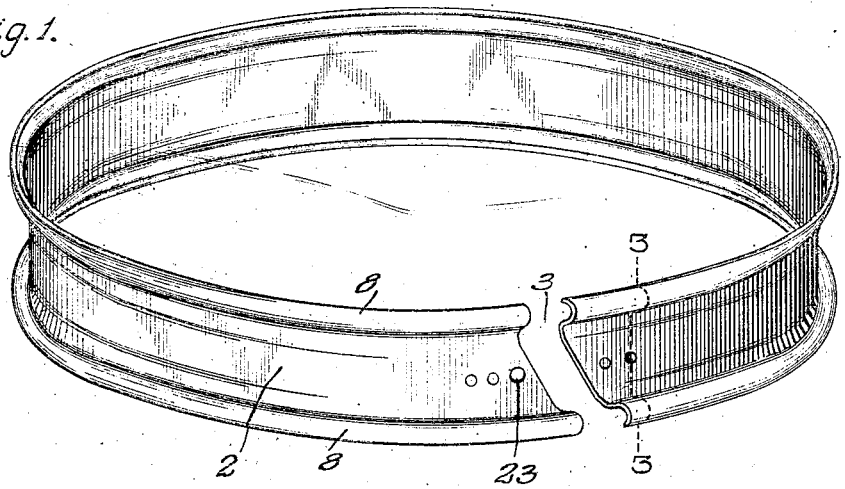

E. K. BAKER.
DEMOUNTABLE TIRE RIM.
APPLICATION FILED JULY 31, 1911.

1,095,778.

Patented May 5, 1914.

Witnesses:
Archwell Nelson
Edward H Wilson

Inventor:
Erle K. Baker
by
[signature]
Atty

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE TIRE-RIM.

1,095,778.      Specification of Letters Patent.      Patented May 5, 1914.

Continuation in part of application Serial No. 566,605, filed June 13, 1910. This application filed July 31, 1911. Serial No. 641,494.

*To all whom it may concern:*

Be it known that I, ERLE K. BAKER, a citizen of the United States, and a resident of Chicago, Cook county, Illinois, have invented certain new and useful Improvements in Demountable Tire-Rims, of which the following is a full, true, clear, and exact description, such as will enable others skilled in the art to make and use the same.

My invention relates to improvements in demountable tire carrying rims of the kind which are somewhat larger than the automobile wheels with which they are designed to be used and which are secured to their wheels by means of clamping wedge devices, usually called wedge lugs, which wedge between the rim and the wheel periphery to hold the rim away from said periphery and yet firmly secure it in place upon the wheel. Such demountable rims are often referred to as bolted on rims because the wedge lugs are secured and operated by transverse bolts in the felly of the wheel.

This invention has special reference to improvements in demountable rims formed in the manner and for the purposes generally set forth in my co-pending applications Serial No. 501,245, filed June 10th, 1909, and Serial No. 502,069, filed June 14th, 1909, and this application is a continuation of and in the nature of a division of my co-pending application Serial No. 566,605, filed June 13th, 1910.

Heretofore it has been necessary to make such bolted on rims in the form of endless rings to withstand the expanding strains of the wedge lugs. For automobile tires having stretchable base beads it has been customary to provide these endless rims with endless integral flanges of the clencher type whereas such rims were intended to receive tires having non-stretchable base beads it has been thought necessary to make the rims in two or more parts arranged to secure the tire between them, one part being the rim proper and the other a detachable flange for the outer edge thereof. Rims of the first form are objectionable because their use is limited to one type of tire and indeed a type which is fast going out of use, and rims of the second kind are objectionable because of their excessive weight, because they are slow to operate, because loose outside rings frequently blow off with disastrous results, and because they are expensive to make and assemble.

The object of my invention is to provide a one piece demountable rim of the class here defined which shall have integral tire retaining flanges and nevertheless shall be adapted for use with tires of all descriptions including such as have non-stretchable base beads and shall be of such form that it may be very easily put into or taken out of such tires without the aid of contracting tools.

With this object in view my invention consists generally in an integrally flanged demountable rim which contains a valve stem hole for the valve stem of a pneumatic tire and which is transversely split or open at a point close to said valve stem hole, said split being formed by a cut beginning at a point on one edge of the rim and extending to a circumferentially advanced point on the other edge of the rim.

My invention also consists in various novel details of construction and in combinations of parts all as hereinafter described and particularly pointed out in the claims.

Figure 2:
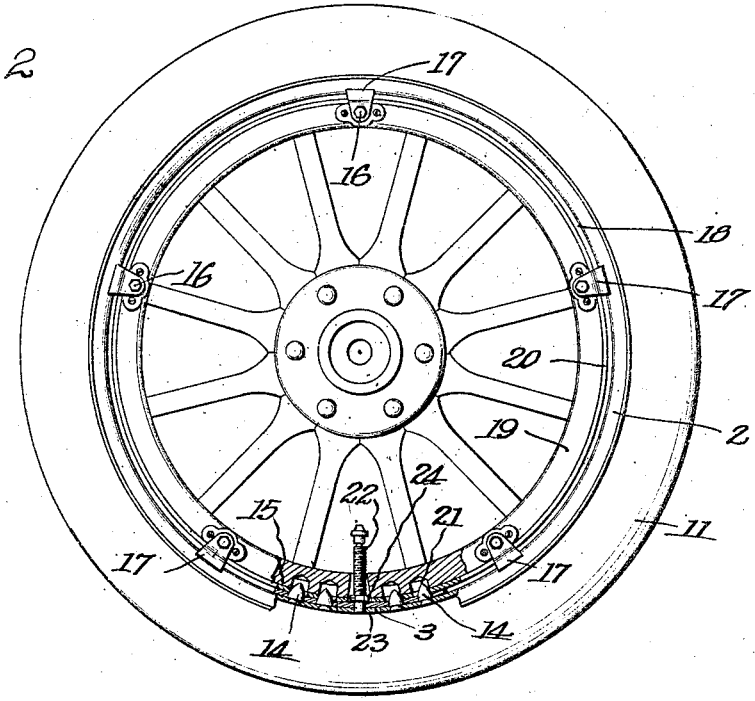
Figure 3:
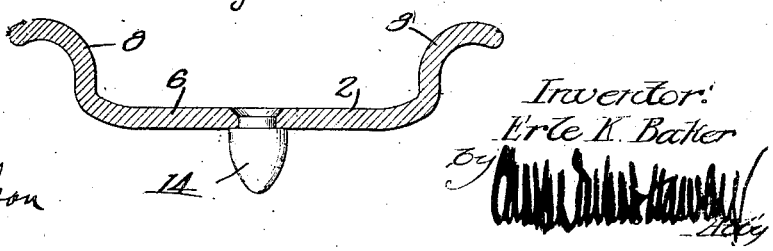

The invention will be more readily understood by reference to the accompanying drawings forming a part of this specification, and in which, Figure 1 is a perspective view of my novel demountable rim; Fig. 2 illustrates an automobile wheel and tire equipped with said rim; and, Fig. 3 is an enlarged cross section on the line 3—3 of Fig. 1.

As shown in the drawings, an ordinary automobile wheel has a felly 19 and a metal felly band 20. The side of the felly carries a plurality of wedge lugs or clamping devices 17 operated and secured by means of bolts 16. My novel rim 2 is larger than the felly band so that an annular space 18 is left between the rim and band to receive the wedge lugs 17. As clearly shown in the drawings the rim is a metal ring comprising a substantially cylindrical body portion 6 and tire retaining flanges 8, 8 which are integral therewith and of a shape suited to the tire to be carried. The rim is sawed apart or split transversely to form a. split or gap 3 correctly shown in Fig. 2 and much exaggerated in Fig. 1, as by the distention of the rim. The split or saw cut is made on a diagonal line, that is on a line which is inclined with respect to the middle plane of the rim. Directly adjacent to the split and in one end of the rim I form a valve stem hole 23 to receive the valve stem 22 of a pneumatic tire 11. Each end of the rim as here shown is provided with one or more inwardly extending studs 14, and to secure the rim ends together so that the rim shall become a virtually endless ring when on the wheel I connect these studs 14 by a curved plate 15. This plate contains holes to receive the studs and is of a thickness to substantially fill the annular space 18 adjacent to the valve stem. The studs project through holes 21 in the periphery of the felly and constitute a driver connection between the rim and wheel. The plate also contains a hole for the reception of the valve stem and when the parts are assembled as in Fig. 2 the plate is preferably secured as by a nut 24 on the threaded valve stem.

The advantages of the described construction are as follows: The rim ends by reason of their formation may be readily separated in their own plane, that is in a transverse direction to temporarily distort the rim into helical form as an aid in placing the rim in and taking it out of a tire. The rim end connecting plate 15 bridges the split 3 on the inner periphery of the rim, and by reason of the location of the valve stem next to the split the metallic parts commonly used upon the inner end of a valve stem, that is the metallic connections of the valve stem to the inner tube of the tire will effectually bridge the gap or split 3 upon the outer periphery of the rim.

Having thus described my invention I claim as new and desire to secure by Letters Patent:

1. A one piece integrally flanged demountable rim characterized by a diagonal transverse split or cut and a valve stem hole in one end next to said split, substantially as described.

2. A one piece integrally flanged demountable rim characterized by a diagonal transverse split or cut and a valve stem hole in one end next to said split, in combination with a rim end bridging and fastening plate containing a corresponding valve stem hole.

In testimony whereof, I have hereunto set my hand, this 29th day of July, 1911, in the presence of two subscribing witnesses.

ERLE K. BAKER.

Witnesses:
　EDWARD F. WILSON,
　JOHN R. LEFEVRE.